United States Patent
Pratt et al.

(10) Patent No.: US 8,953,943 B2
(45) Date of Patent: Feb. 10, 2015

(54) METHODS AND SYSTEMS FOR SYNCHRONOUS SIGNALING ACROSS MULTIPLE DOWNSTREAM WAVELENGTHS IN A PASSIVE OPTICAL NETWORK

(75) Inventors: Bruce C. Pratt, Bedford, NH (US); David B. Bowler, Acton, MA (US); Xinfa Ma, Acton, MA (US); Robert S. Magaldi, North Andover, MA (US)

(73) Assignee: Google Technology Holdings LLC, Libertyville, IL (US)

( * ) Notice: Subject to any disclaimer, the term of this patent is extended or adjusted under 35 U.S.C. 154(b) by 450 days.

(21) Appl. No.: 13/279,656

(22) Filed: Oct. 24, 2011

(65) Prior Publication Data

US 2013/0101294 A1 Apr. 25, 2013

(51) Int. Cl.
*H04J 4/00* (2006.01)
*H04J 3/06* (2006.01)
*H04J 14/02* (2006.01)
*H04B 10/00* (2013.01)

(52) U.S. Cl.
CPC ........... *H04J 3/0694* (2013.01); *H04J 14/0246* (2013.01); *H04J 14/0252* (2013.01); *H04J 14/0282* (2013.01)
USPC ............................................. 398/75; 398/74

(58) Field of Classification Search
CPC .............. H04J 14/0242; H04J 14/0245; H04J 14/0246; H04J 14/2052
USPC ......................................................... 398/74, 75
See application file for complete search history.

(56) References Cited

U.S. PATENT DOCUMENTS

| | | | |
|---|---|---|---|
| 6,151,144 | A | 11/2000 | Knox |
| 6,411,410 | B1 * | 6/2002 | Wright et al. .................. 398/79 |
| 7,330,438 | B2 | 2/2008 | Kim et al. |
| 2006/0239682 | A1 | 10/2006 | Park et al. |
| 2007/0166037 | A1 * | 7/2007 | Palacharla et al. ............. 398/72 |
| 2008/0089684 | A1 | 4/2008 | Smith et al. |
| 2009/0162065 | A1 * | 6/2009 | Mizutani et al. ............... 398/66 |
| 2009/0220231 | A1 | 9/2009 | Zimmel et al. |

OTHER PUBLICATIONS

"Optical Line Termination", Feb. 15, 2008, retrieved from https://web.archive.org/web/20080215082723/http://en.wikipedia.org/wiki/Optical_Line_Termination on Aug. 8, 2014.*

* cited by examiner

*Primary Examiner* — Daniel Dobson
(74) *Attorney, Agent, or Firm* — Honigman Miller Schwartz and Cohn LLP

(57) ABSTRACT

A method (100) of operation in a passive optical network system (600) includes transmitting wave division multiplexed data in a downstream link (617) of an optical distribution network (618) using a plurality of optical line terminals (601,602,603). Each optical line terminal (601,602,603) operates at a unique wavelength, and is synchronized to each other optical line terminal by a common reference (643). Upstream data is received from an upstream link (619) of the optical distribution network on a shared common upstream wavelength (620).

19 Claims, 7 Drawing Sheets

METHODS AND SYSTEMS FOR SYNCHRONOUS SIGNALING ACROSS MULTIPLE DOWNSTREAM WAVELENGTHS IN A PASSIVE OPTICAL NETWORK

BACKGROUND

1. Technical Field

This invention relates generally to passive optical networks, and more particularly to data transmission and reception systems and methods for passive optical networks.

2. Background Art

Passive optical networks transmit large amounts of data using optical fibers. In passive optical network systems, unpowered optical splitters allow a single fiber to serve multiple end units, which are commonly referred to as optical network units or optical network terminals. Optical network units are end units configured, typically, to serve multiple users. For example, an optical network unit may serve the occupants of an apartment building. Optical network terminals are end units serving a single user, such as a residence or business.

An optical line terminal is disposed at one end of the passive optical network, with the end unit disposed at the other. The optical line terminal, frequently part of a communication service provider's hardware, is a device that receives electrical signals from service providers, converts those signals to optical signals, and then transmits the optical signals to end units across the optical data network. In traditional passive optical network systems, the optical line terminal delivers a single downstream signal that is received by every end unit. Said differently, each optical network unit or optical network terminal sees the same downstream signal, with data designated for the optical network unit or optical network terminal forming only a portion of the downstream signal. Encryption of packets in the downstream signal prevents one end unit from eavesdropping on the other. Upstream data from the end units is then multiplexed in accordance with a known standard.

While traditional passive optical networks work well in practice, the amount of data that can be transmitted is constrained. The data transmission rate or bandwidth is constrained both by the fact that a common downstream signal must be shared by multiple users and by the physical cost required to increase transmission rates. Small increases in data transmission rates can require an exponential increase in cost. It would be advantageous to have methods and systems suitable for passive optical networks that can increase data transmission rates without significantly increasing cost.

Figure 1:
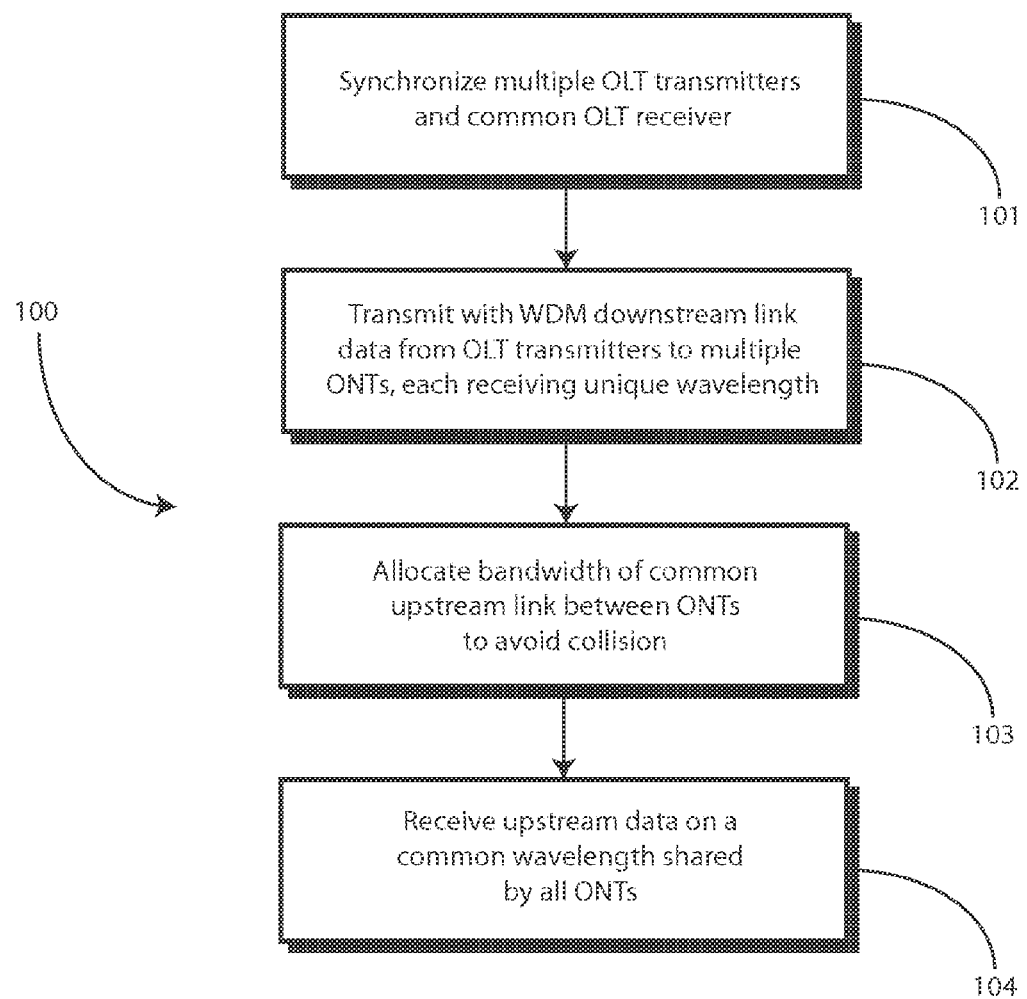
FIG. 1 illustrates a method of operation in a passive optical network configured in accordance with one or more embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EMBODIMENTS OF THE INVENTION

Before describing in detail embodiments that are in accordance with the present invention, it should be observed that the embodiments reside primarily in combinations of method steps and apparatus components related to transmission of data in a passive optical network employing wave division multiplexing downstream and a shared common wavelength upstream. Any process descriptions or blocks in flow charts should be understood as representing modules, segments, or portions of code, which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of transmitting and receiving data in a passive optical network as described herein. The non-processor circuits may include, but are not limited to, optical drivers, optical filters, optical receivers, optic to electronic signal converters, multiplexers, demultiplexers, signal drivers, clock circuits, power source circuits, and control devices. As such, these functions may be interpreted as steps of a method to perform wave division multiplexed transmission by synchronous optical line terminals with upstream data reception on a shared common wavelength. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a system level approach for passive optical networks that allow cost effective increasing of downstream bandwidth while efficiently managing a shared upstream link on a common wavelength that avoids collisions. In one or more embodiments, multiple optical line terminals are synchronized with a single, common reference. When synchronized, the optical line terminals are capable of transmitting wave division multiplexed data in a downstream link, with each optical line terminal operating at a different wavelength or color. At the same time, upstream data can be received from a plurality of end units on a shared, common, upstream wavelength using temporal multiplexing. For the purposes of the description below, optical network terminal and optical network unit will be used interchangeably, with each representing an end unit of a passive optical network system disposed opposite the optical distribution network from the optical line terminals.

Embodiments of the present invention provide advantages over prior art systems in that wave division multiplexing can be used downstream with a shared upstream wavelength that can be used by multiple optical network terminals without data collision. Embodiments of the present invention can provide, for example, 4× increases (or more) in downstream data transmission rates with only a modest incremental increase in system cost, and while avoiding upstream data collisions.

Turning to FIG. 1, illustrated therein is one explanatory method 100 of operation in a passive optical network, with steps occurring in accordance with one or more embodiments of the invention. At step 101, each of a plurality of optical line terminals is synchronized with the other optical line terminals. In one embodiment, each of the optical line terminals is operational at a different wavelength, and accordingly is configured to transmit data with a unique color. For instance, a first optical line terminal may transmit at 530 nm, while another transmits at 640 nm, with a third transmitting at 720 nm, and so forth. In one embodiment, synchronization occurs by providing a common reference or common clock to all optical line terminals that can be used for data transmission.

At step 102, the optical line terminals transmit data via wave division multiplexing to a plurality of optical network terminals. In one embodiment, a multiplexer is disposed between the optical line terminals and the optical distribution network. The multiplexer can join the signals of various wavelengths into a common signal across the optical distribution network. While each optical line terminal can be configured to transmit data with a different color, multiple optical network terminals can receive a particular color, with encryption being used to prevent eavesdropping. For example, in a system having three optical line terminals and nine optical network terminals, a first optical line terminal can be configured to transmit data at 530 nm to three of the optical network terminals. Similarly, a second optical line terminal can be configured to transmit data to three other optical network terminals at 640 nm. A third optical line terminal can be configured to transmit data at 720 nm, with the final three optical network terminals receiving the same. Encryption can be used to ensure the three optical network terminals receiving data at the 530 nm wavelength do not eavesdrop on each other. In short, while wave division multiplexing includes transmitting data when each optical line terminal operates at a unique wavelength, an optical line terminal can transmit to multiple optical network terminals with its unique wavelength.

At step 103, upstream bandwidth on a common, shared upstream wavelength is allocated to each of the optical network terminals. In one embodiment, this allocation is delivered in accordance with a multiple access protocol for the shared common upstream wavelength. One example of a multiple access protocol is time division multiple access. With time division multiple access, each optical network terminal is allocated a unique timeslot on the shared common upstream link in which it should transmit data. In one embodiment, each optical network terminal receives its reference from the wave division multiplexed downstream signal. Since the optical line terminals are all synchronized with a common reference at step 101, each optical network terminal will accordingly be synchronized with a common reference. The synchronization occurring at step 101 not only permits downstream wave division multiplexing and a shared upstream wavelength, but also serves to synchronize the optical line terminals to prevent data collisions in the upstream link.

At step 104, upstream data is received. In one embodiment, the upstream link functions on a single, common, shared wavelength that is shared by all optical network devices. While time division multiplexing from commonly referenced optical network terminals can be used in the upstream link, it will be clear to those of ordinary skill in the art having the benefit of this disclosure that embodiments of the invention are not so limited. To with, other upstream multiple access protocols can be used as well, including code division multiplexing, spatial multiplexing, and so forth.

While the method 100 of FIG. 1 provides an overview of one method of operation in a passive optical network in accordance with one or more embodiments, of the invention, the advantages associated with embodiments of the invention become more readily apparent when the methods and systems described herein are compared with prior art systems. As shown in FIG. 1, in one embodiment, multiple optical line terminals are synchronized and transmit downstream using unique wavelengths in a wave division multiplexed mode while upstream transmission shares a common upstream wavelength. This differs from traditional systems where a shared wavelength is used both downstream and upstream. As noted above, when using a singular wavelength both down and up, this limited bandwidth must be shared by all devices, thereby constraining data rate. Using the method of FIG. 1, downstream transmission rates can be significantly increased via wave division multiplexing.

Figure 2:
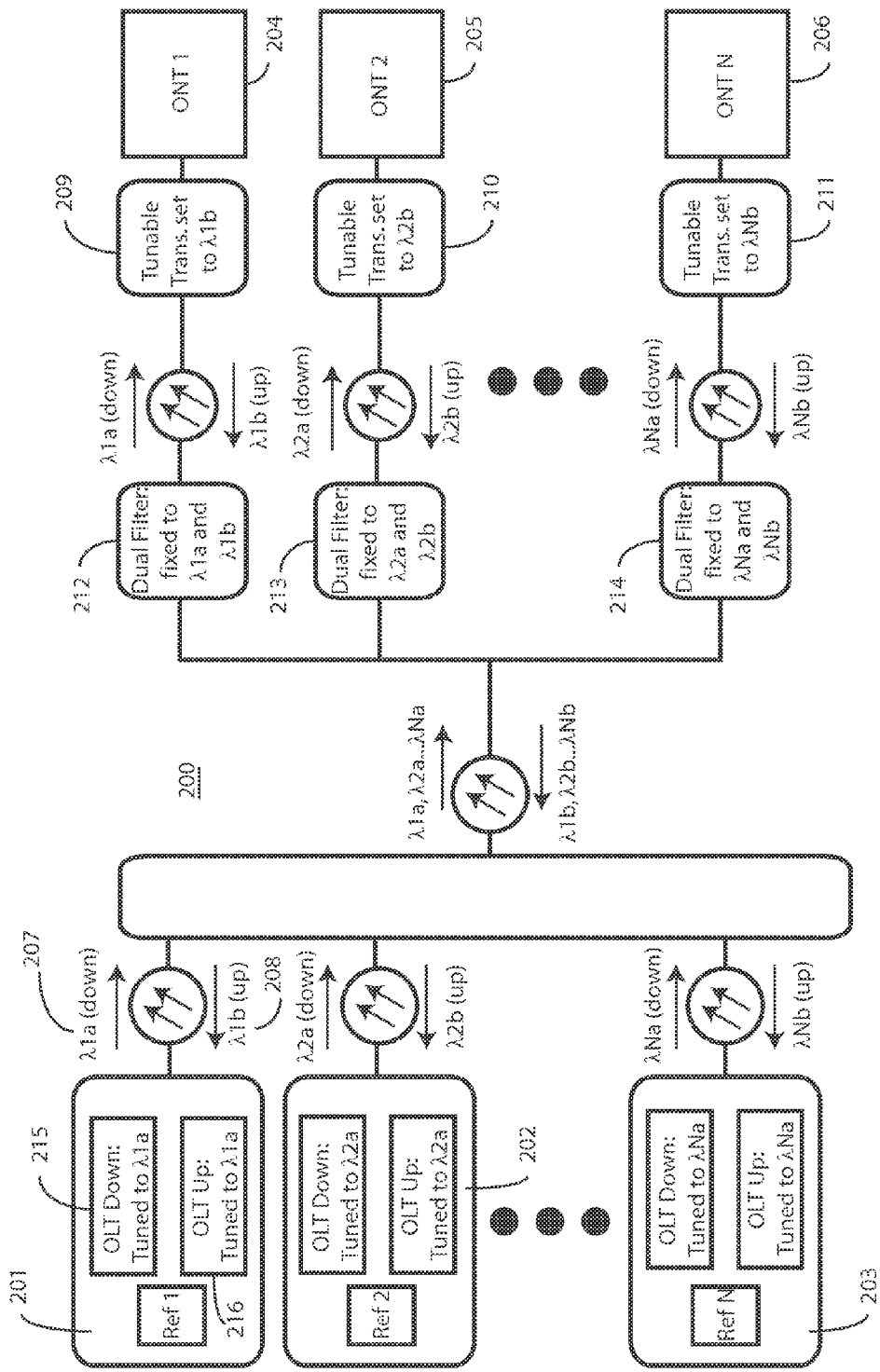
FIG. 2 illustrates a prior art passive optical network system.

System designers have long grappled with the "shared wavelength—limited bandwidth" problem. Turning to FIG. 2, illustrated therein is one prior art attempt to increase transmission rates by using wave division multiplexing. The problem with the system 200 of FIG. 2 is that it is cost prohibitive for most all applications.

The prior art system 200 of FIG. 2 includes multiple optical line terminals 201,202,203 and multiple optical network terminals 204,205,206. Each optical line terminal 201,202,203 and optical network terminal 204,205,206 transmits and receives on a unique wavelength. For example, optical line terminal 201 transmits downstream on a first wavelength 207 to optical network terminal 204. Similarly, optical line terminal 201 receives upstream data on a second wavelength 208 that is different from, but associated with, the first wavelength 207. Accordingly, there is a one-to-one correspondence of the wave division multiplex wavelengths—each optical line terminal 201,202,203 employs a unique wavelength down and another unique wavelength upstream.

A first problem with the system 200 of FIG. 2 is that each optical network terminal 204,205,206 is required to employ a tunable transceiver and dual filter, both of which are expensive components. For example, optical network terminal 204 is required to have a tunable transceiver 209 and a dual filter 212. The tunable transceiver 209 must be adjustable such that it can transmit data upstream in any of a variety of wavelengths, with the wavelength being set by the optical line terminal 201 from which the optical network terminal 204 is receiving data. The tunable transceiver 209 must also be tunable so as to receive the particular wavelength its corresponding optical line terminal 201 is delivering. Laser sources that can be tuned to transmit and/or receive in different colors are generally very expensive.

The second problem is that the dual filter 212 must be set to receive the first wavelength 207 and to transmit the second wavelength 208. As shown in FIG. 2, this requirement results in each dual filter 212,213,214 having its own unique design. This requirement adds additional cost to the system.

Just as the optical network terminals 204,205,206 are required to use tunable transceivers 209,210,211, so too are the optical line terminals 201,202,203. For example, optical line terminal 201 must have a downstream laser 215 that is tunable to the first wavelength 207 and an upstream receiver 216 that can be tuned to the second wavelength 208. This requirement again increases cost.

While the wave division multiplexing offered by the system 200 of FIG. 2 does increase system bandwidth, the cumulative effect of the cost adders noted above makes the system cost prohibitive for most commercial applications. The "one-to-one" correspondence of a unique wavelength downstream combined with a unique wavelength upstream for each optical network terminal 204,205,206 cannot be used, for example, in systems delivering television and broadband communications to homes because it is cost prohibitive. Instead it is only applicable to small trunk networks, across short distances, where commercial customers transmit and receive data on the order of gigabytes per second. For all other applications, the system 200 of FIG. 2 is simply too expensive.

Figure 3:
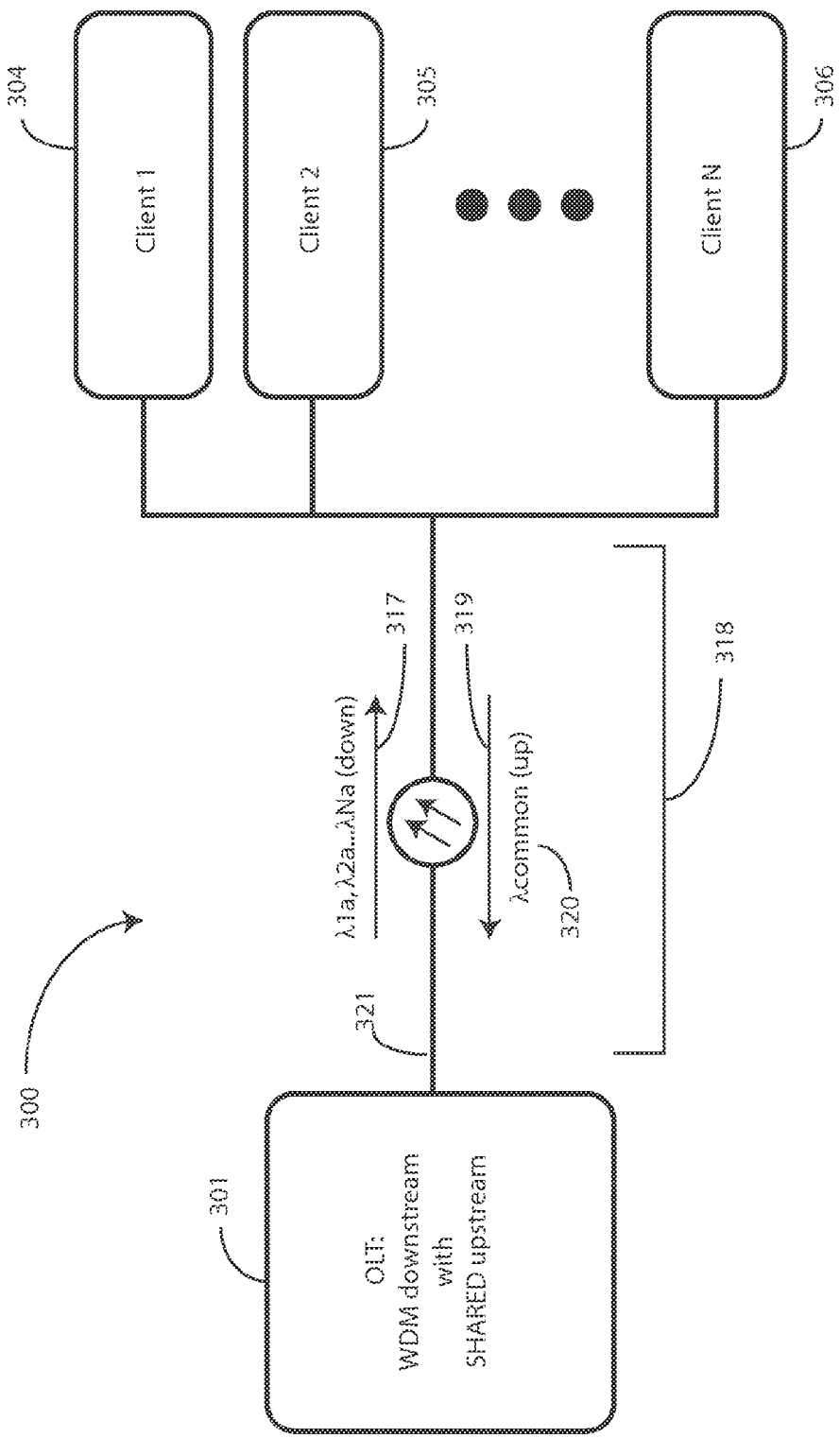
FIG. 3 illustrates one explanatory passive optical network system that employs passive optical network components configured in accordance with one or more embodiments of the invention.

Turning to FIG. 3, illustrated therein is a passive optical network 300 configured in accordance with one or more embodiments of the invention. The simplicity of FIG. 3 is a counterpoint to the complexity of the system (200) of FIG. 2. This simplification of the passive optical network 300 of FIG. 3 over the system (200) of FIG. 2 parallels the cost savings that are realized when using the methods and systems described herein.

In FIG. 3, a plurality of optical line transmission terminals, shown collectively as passive optical network component 301, is configured for wavelength division multiplexed transmission of data in the downstream link 317 on an optical distribution network 318 to a plurality of optical network terminals 304,305,306. In one embodiment, the optical distribution network 318 comprises an optical fiber 321 shared by both the optical line transmission terminals of the passive optical network component 301 and the optical network terminals 304,305,306.

A synchronizer, which forms an element of the passive optical network component 301, is configured to synchronize signaling from each of the plurality of optical line transmission terminals with a common reference as described above. To illustrate by way of example, a first optical line transmission terminal can be configured to transmit data at a first wavelength in accordance with the common reference from the synchronizer, while a second optical line transmission terminal can be configured to transmit data at a second wavelength in accordance with the common reference. Accordingly, the first optical line transmission terminal and the second optical line transmission terminal transmit data at different colors, thereby expanding the capacity of the optical distribution network 318.

However, to alleviate the need for uniquely designed filters and tunable transceivers, which added to both complexity and cost in the system (200) of FIG. 2, the passive optical network component 301 includes an optical line receiver terminal that is configured to receive data via the upstream link 319 of the optical distribution network 318 on a common wavelength 320 that is shared by each of the optical network terminals 304,305,306. Thus, in contrast to the "one-to-one" correspondence of the system (200) of FIG. 2, each of the optical network terminals 304,305,306 in the passive optical network 300 of FIG. 3 transmits upstream data on a shared, common wavelength 320, thereby eliminating the need for a tunable transceiver in each optical network terminal 304,305,306. In one embodiment, the common wavelength 320 shared by the optical network terminals 304,305,306 is different from both the first wavelength and the second wavelength—or other wavelengths—present in the downstream link 317.

Figure 4:
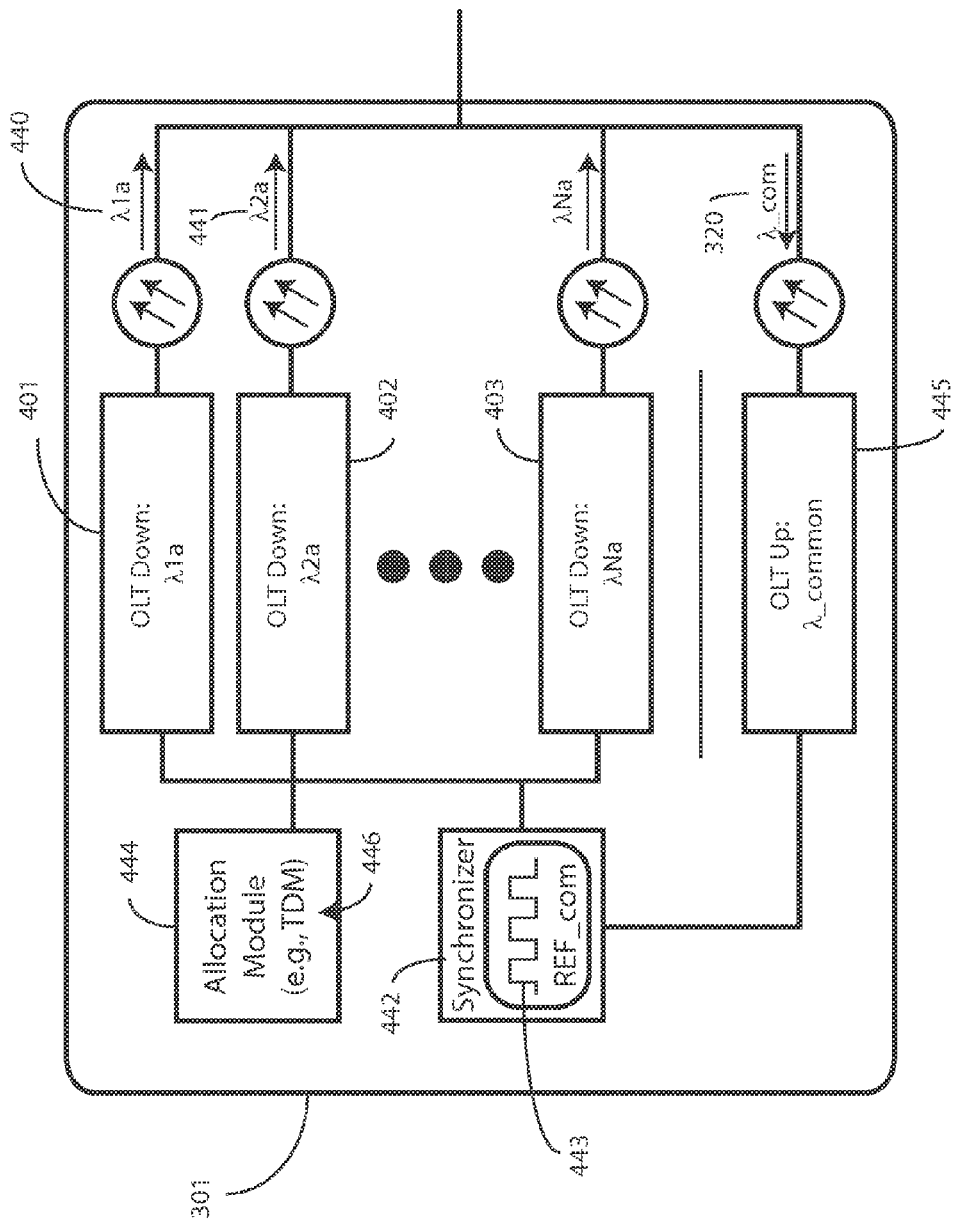
FIG. 4 illustrates one explanatory passive optical network component configured in accordance with one or more embodiments of the invention.

FIG. 4 illustrates a schematic block diagram of one embodiment of the passive optical network component 301 from FIG. 3. A plurality of optical line transmission terminals 401,402,403 are configured for wavelength division multiplexed downstream data transmission. Each optical line transmission terminal 401,402,403 operates at a unique wavelength. For example, a first optical line transmission terminal 401 is configured to transmit at a first wavelength 440. A second optical line transmission terminal 402 is configured to transmit at a second wavelength 441, and so forth.

A synchronizer 442 is configured to synchronize signaling from each optical line transmission terminal 401,402,403. In one embodiment, synchronization comprises delivering a common reference 443 to each optical line transmission terminal 401,402,403.

An allocation module 444 functions as an upstream link manager in that it manages the upstream link of the optical distribution network (318) to prevent data collisions when each optical network terminal (304,305,306) transmits data in the upstream link (319). In one embodiment, the allocation module 444 allocates a predetermined bandwidth of the upstream link (319) to each optical network terminal (304,305,306) coupled to the optical distribution network (318) by specifying time slots in which the optical network terminals (304,305,306) may transmit by instructing the optical network terminals (304,305,306) to transmit in the upstream link (319) using a time division multiple access protocol 446.

Figure 5:
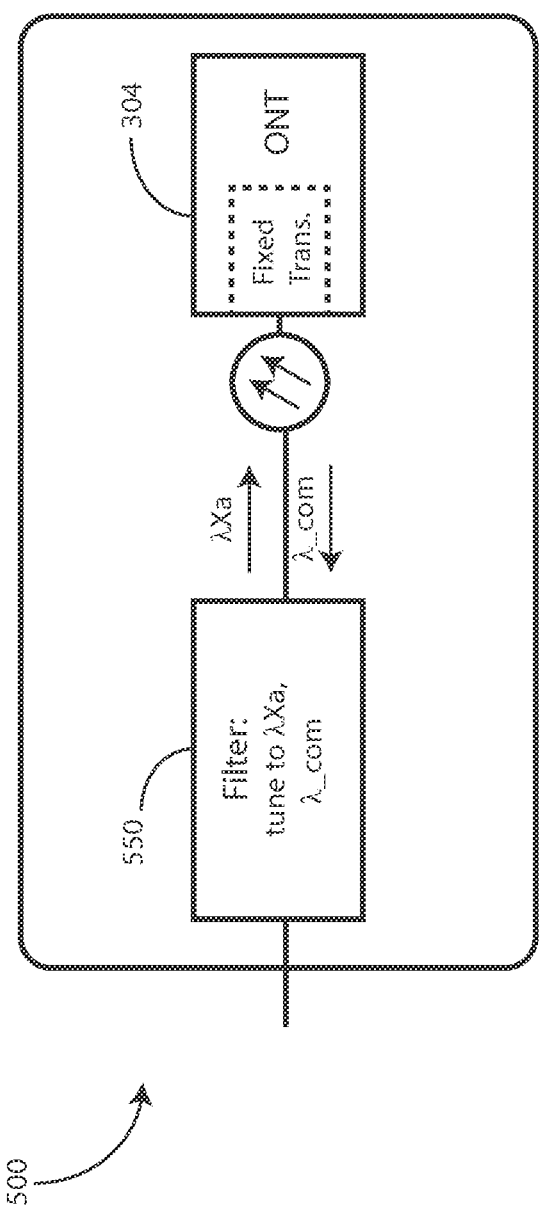
FIG. 5 illustrates another explanatory passive optical network component configured in accordance with one or more embodiments of the invention.

FIG. 5 illustrates one embodiment of an end unit 500 comprising an optical network terminal 304 configured in accordance with one or more embodiments of the invention. The end unit 500 of this illustrative embodiment includes the optical network terminal 304 and a corresponding tunable optical filter 550.

Recall from above that tunable transceivers can be prohibitively expensive in many applications because the manufacture of laser sources capable of being tuned to different colors is an expensive endeavor. By contrast, tunable optical filters can be manufactured relatively inexpensively. Since each optical network terminal (304,305,306) in accordance with embodiments of the present invention each transmits on the shared, common wavelength (320) in the upstream link (319), tunable transceivers are not needed in the optical network terminal 304. However, to accommodate wavelength division multiplexed transmission in the downstream link (317), in one embodiment a tunable optical filter 550 is included. The tunable optical filter 550 is configured to be tunable to a predetermined wavelength the optical network terminal 304 is intended to receive. Said differently, in one embodiment the tunable optical filter 550, being disposed between the optical distribution network (318) and each optical network terminal 304, is configured to select a single wavelength, e.g., first wavelength (440), from a plurality of multiple coexistent wavelengths propagating in the downstream link (317) of the optical distribution network (318). In this manner, the tunable optical filter 550 selects the data intended for its optical network terminal 304.

Turning back to FIG. 4, in addition to allocating bandwidth in the upstream link (319), in one embodiment the allocation module 444 is further configured to tune each of the optical network terminals (304,305,306) to receive a predetermined wavelength that is different from every other wavelength received by other optical network terminals. For example, the allocation module 444 can be configured to tune the tunable optical filter (550) for one optical network terminal (304) to receive a color that is unique to that optical network terminal (304). The allocation module 444 can similarly tune the other tunable filters to receive different colors.

While the allocation module 444 can be configured to tune each tunable filter, it will be clear to those of ordinary skill in the art having the benefit of this disclosure that the tunable filters can be tuned in other ways as well. For example, a service provider may provide system-level definitions of what wavelengths or colors will be received by certain optical network terminals (304,305,306). Accordingly, when those optical network terminals are installed, the installer may program the corresponding tunable filter to pass a predetermined wavelength to the optical network terminal. For example, if optical network terminal (304) is to receive a 640 nm wavelength, its tunable optical filter (550), which is a band-pass filter in one embodiment, may be set to filter the various multiple coexistent wavelengths being transmitted in the downstream link (317) to obtain the predetermined wavelength intended for optical network terminal (304), i.e., the 640 nm wavelength. Other tuning mechanisms can be used as well.

The passive optical network component 301 of FIG. 4 includes an optical line receiver terminal 445. In this illustrative embodiment, the optical line receiver terminal 445 is synchronized to the common reference 443 provided by the synchronizer 442. The optical line receiver terminal 445 is configured to receive upstream data from the optical distribution network (318) on a common wavelength 320. The common wavelength 320 is shared by each of the optical network terminals (304,305,306) that are in communication with the passive optical network component 301.

Figure 6:
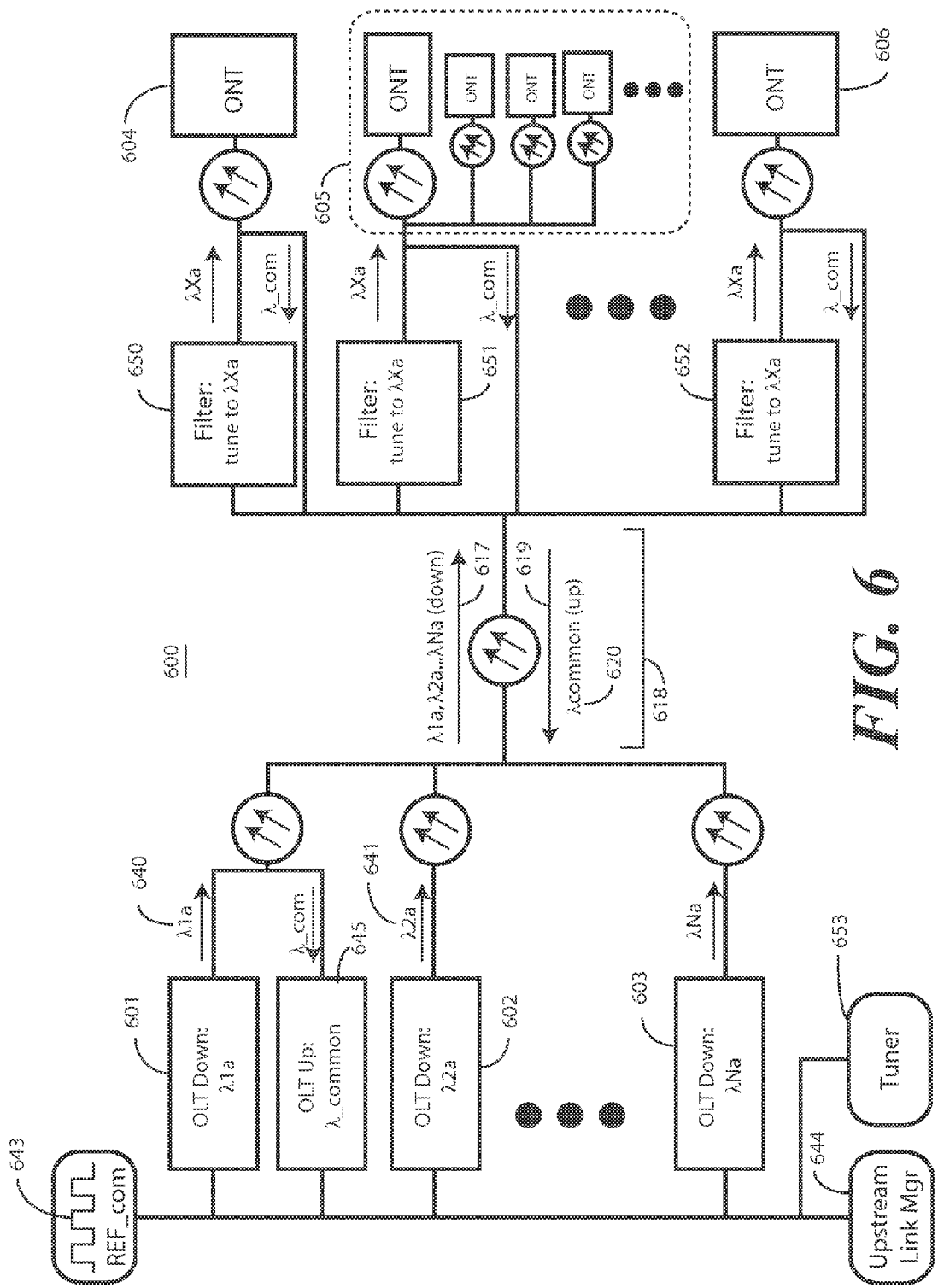
FIG. 6 illustrates a schematic block diagram of one explanatory passive optical network system configured in accordance with one or more embodiments of the invention.

Turning now to FIG. 6, illustrated therein is one passive optical network system 600 that incorporates the elements of FIGS. 4 and 5 together to form a system that accommodates wave division multiplexing in the downstream link 617 while sharing a common wavelength 620 in the upstream link 619.

As shown in FIG. 6, multiple optical line terminals 601, 602,603 are configured for wavelength division multiplexed downstream data transmission on an optical distribution network 618 to a plurality of optical network terminals 604,605, 606. Note that while a single optical network terminal 604, 605 is drawn in some situations, it is to be understood that this can represent multiple optical network terminal devices that share a particular downstream wavelength. To this end, optical network terminal 605 has been drawn as one explanatory example of multiple optical network terminals sharing a single downstream wavelength. Accordingly, as used in the figures, any singular optical network terminal should be understood as representing either a single optical network terminal or a plurality of optical network terminals sharing a common downstream bandwidth.

For ease of illustration, a single optical distribution network 618 capable of carrying 32 channels is shown in FIG. 6. It will be obvious to those of ordinary skill in the art having the benefit of this disclosure that multiple optical distribution networks can be placed in parallel to carry additional channels.

A common reference 643 synchronizes all optical line terminals 601,602,603. In this embodiment, synchronizing comprises providing a common clock to every optical line terminal 601,602,603.

A first optical line terminal 601 is configured to transmit at a first wavelength 640 according to the common reference 643. Similarly, a second optical line terminal 602 is configured to transmit at a second wavelength 641 according to the common reference. Each optical line terminal 601,602,603 operates at a unique wavelength to transmit wave division multiplexed data along the downstream link 617 of the optical distribution network 618. A combiner (not shown) combines the unique wavelengths for transmission along the downstream link 617.

Having common synchronization, each optical line terminal 601,602,603 is able to operate in a coordinated fashion. Not only do they transmit at different wavelengths, but in one embodiment each optical line terminal 601,602,603 has knowledge of when the other is sending data as well. In one embodiment, this is accomplished by making a first optical line terminal 601 a master, and the remaining optical line terminals 602,603 slaves. Accordingly, each optical line terminal 601,602,603 would be coordinated with the others—not just from a base reference, but also by the frame going down. This coordination facilitates accurate selection of upstream data from the upstream link receiver 645 because each optical network terminal 604,605,606 receives data on the same time base and recognizes the same time "zero" across wavelengths. The common upstream link receiver 645 can then receive all data from the optical network terminals 604,605,606 and then distribute the received data by packet to the appropriate source in one embodiment.

Data for each optical network terminal 604,605,606 is transmitted on the various wavelengths. Some downstream data is transmitted using the first wavelength 640, while other data is transmitted using the second wavelength 641. Illustrating by way of example, optical line terminal 601 may be configured to transmit data to optical network terminal 604 using the first wavelength 640, while optical line terminal 602 may be configured to transmit data to optical network terminal 604 using the second wavelength 641. Note that encryption can still be employed because multiple optical network terminals can share a common color in one or more embodiments to increase the number of optical network terminals served by a single optical distribution network.

As described above, a common wavelength 620 is shared by each of the optical network terminals 604,605,606. In one embodiment, the common wavelength 620 is different from both the first wavelength 640 and the second wavelength 641. A common upstream link receiver 645 is configured to receive upstream data from the optical network terminals 604,605,606 on the common wavelength 620 that is shared by the optical network terminals 604,605,606 on the upstream link 619.

To prevent collisions, an upstream link manager 644 is configured to manage the upstream link 619 of the optical distribution network 618. In one embodiment, the upstream link manager 644 permits the synchronized optical line terminals 601,602,603 to independently control the upstream bursts from the optical network terminals 604,605,606 so there are no collisions in the upstream link 619. In one embodiment, the upstream link manager 644 transmits messages with temporal mapping on the physical network layer indicating in which time slots each optical network terminal 604,605,606 may transmit. In one embodiment, the temporal mapping is in accordance with a time division multiplexed access protocol where the time slots are allocated between the optical network terminals 604,605,606.

While the allocation can be accomplished in a variety of ways, a few explanatory methods will be set forth here. It is understood that each optical network terminal 604,605,606 can be disposed at varying distances from the optical line terminals 601,602,603. As such, the delay between downstream and upstream transmission can be different for each optical network terminal 604,605,606. In one embodiment, the upstream link manager 644 can be configured to measure the delay with test transmissions and set a register in each optical line terminal 601,602,603 to equalize the delay. Once the registers are set, the upstream link manager 644 can be configured to transmit grants to each optical network terminal 604,605,606 on its corresponding wavelength. Each grant serves as a permission slip used to define an interval of time for upstream transmission from a respective optical network terminal 604,605,606. The map of the registers can be periodically recalculated, e.g., every few seconds, to reallocate bandwidth in the upstream link 619.

While the preceding paragraph provides one method of allocating the upstream link 619 to the optical network terminals 604,605,606. However, it will be clear to those of ordinary skill in the art having the benefit of this disclosure that other methods can be used as well. For instance, in another embodiment, the upstream link manager 644 can be configured to employ dynamic bandwidth allocation using statistical multiplexing to manage upstream transmission in accordance with network traffic engineering concepts. In yet another embodiment, reporting schemes can be used. The upstream link manager 644 can poll each optical network terminal 604,605,606 for data backlog levels. Where backlogs are high, more time may be allocated to a particular optical network terminal. In yet another embodiment, each optical network terminal 604,605,606 can be configured with a predefined allocation, combined with instructions to transmit blank frames when no data is present. The upstream link manager 644 can be configured to increase or decrease a particular allocation based upon the number (or lack of) idle frames being transmitted.

Regardless of method, the upstream link manager 644 provides each optical network terminal 604,605,606 with the knowledge of when in time to transmit using a framing protocol. Moreover, each optical line terminal 601,602,603 has corresponding information such that it may select data from its optical network terminal when received by the upstream link receiver 645.

As shown in FIG. 6, each optical network terminal 604,605,606 has associated therewith a tunable optical filter 650,651,652. The tunable optical filters 650,651,652 in this illustrative embodiment are configured as band pass filters. Each tunable optical filter 650,651,652 is commonly configured to pass the shared, common upstream wavelength 620. However, each tunable optical filter 650,651,652 is uniquely tuned to receive a predetermined wavelength that is different from every other wavelength received by others of the optical network terminals.

Note that the term "predetermined" is used to designate a particular wavelength that a corresponding optical network terminal 604,605,606 should receive. The tuning can be done dynamically. In one embodiment, a pre-designated wavelength can be used to discover a new optical network terminal that is added to the system. Once that optical network terminal is recognized by the system, it could be directed to tune to a new wavelength it should receive, i.e., its predetermined wavelength, by the optical line terminal based on current bandwidth or demand conditions. Illustrating by example, during the evening, residential optical network terminals can be re-tuned to a new predetermined wavelength that is ordinarily used by businesses during the day. Accordingly, its predetermined wavelength during the evening would be different from its predetermined wavelength during the day.

Referring again to FIG. 6, tunable optical filter 650 may be tuned to receive a 640 nm wavelength during the day, while tunable optical filter 651 may be tuned to receive a 680 nm wavelength, and so forth. These wavelengths serve as the predetermined wavelengths for tunable optical filters 650 and 651, respectively, during the day. At night, tunable optical filter 650 may be tuned to receive a different predetermined wavelength, such as 720 nm, and so forth.

In one embodiment, all of the optical network terminals 604,605,606 can be configured to transmit, for example, a common wavelength of 780 nm. By using the common wavelength 620, each optical network terminal 604,605,606 can use a fixed transmitting laser. Said differently, there is no requirement that the transmitting laser sources of the optical network terminals 604,605,606 be tunable.

In one embodiment, an optional tuner 653 at the optical line terminal side of the optical distribution network 618 is configured to tune each of the tunable optical filters 650,651,652 to its predetermined wavelength. As noted above, the predetermined wavelength can change. Where a tuner 653 is used, the overall passive optical network system 600 becomes dynamic such that the tunable optical filters 650,651,652 can be tuned to different colors based upon factors such as distance, bandwidth consumption, and so forth. Illustrating by example, the tunable optical filters 650,651,652 can be tuned such that optical network terminals closer to the optical line terminals 601,602,603 receive wavelengths of 850 nm, while those disposed at medium distances receive wavelengths of 1310 nm. Those further away can be tuned to receive wavelengths of 1550 nm, and so forth. In other embodiments where a tuner 653 is not used, other devices can be used to tune each tunable optical filter 650,651,652. As noted above, in one embodiment, the tunable optical filters 650,651,652 can be tuned at installation in accordance with a system plan.

The passive optical network system 600 of FIG. 6 allows increased bandwidth of gigabit-capable systems in an extremely cost effective manner. For example, using four 2.5 gigabit/s optical line terminals, a 10 gigabit/s downstream bit rate can be achieved for a fraction of the cost that using a single 10 gigbit/s optical line terminal would incur. Similarly, it is less expensive to user four 10 gigabit/s transmitters to obtain a 40 gigabit/s downstream link than to use a single 40 gigabit/s transmitter.

Cost reduction comes primarily from four factors: First, lower rate optical line terminals are less expensive than are higher rate optical line terminals. Second, since a common upstream wavelength 620 is used, each optical network terminal 604,605,606 can use a fixed wavelength transmitter. Third, the incremental cost of employing tunable optical filters 650,651,652 is far less than the incremental cost of tunable transmitters. Fourth, a common upstream link receiver 645 can be used, rather than one receiver for each optical line terminal as was the case in FIG. 2. Synchronization with the common clock across all optical line terminals 601,602,603 makes this cost savings possible. In short, a system with synchronous signaling across multiple downstream wavelengths can provide desired increases in downstream bandwidth with only a modest incremental increase in system cost. Experimental analysis suggests that a 4× increase in downstream bandwidth can be achieved with only a 10-15% cost adder compared to systems that employ a single wavelength both down and up. Note that embodiments of the invention are applicable to various passive optical network systems, including GPON, EPON, and other network architectures.

Advantageously, the passive optical network system 600 of FIG. 6 offers many advantages over prior art systems. A first advantage is that tunable optical filters 650,651,652 can be used instead of the tunable optical transmitters that were required in the system (200) of FIG. 2. Tunable optical filters are vastly less expensive than are tunable lasers.

A second advantage is that the tunable optical filters 650, 651,652 eliminate the need for the fixed filters that were required in the system (200) of FIG. 2. This allows for system reconfigurability in that the filters can be dynamically tuned based upon system conditions.

A third advantage is that the upstream link 619 is simplified. This is true because the upstream link receiver 645 can run in a continuous mode, receiving data from all optical network terminals 604,605,606. By contrast, each receiver of the system (200) of FIG. 2 must not only be duplicated across optical line terminals, but must run in a burst mode.

Figure 7:
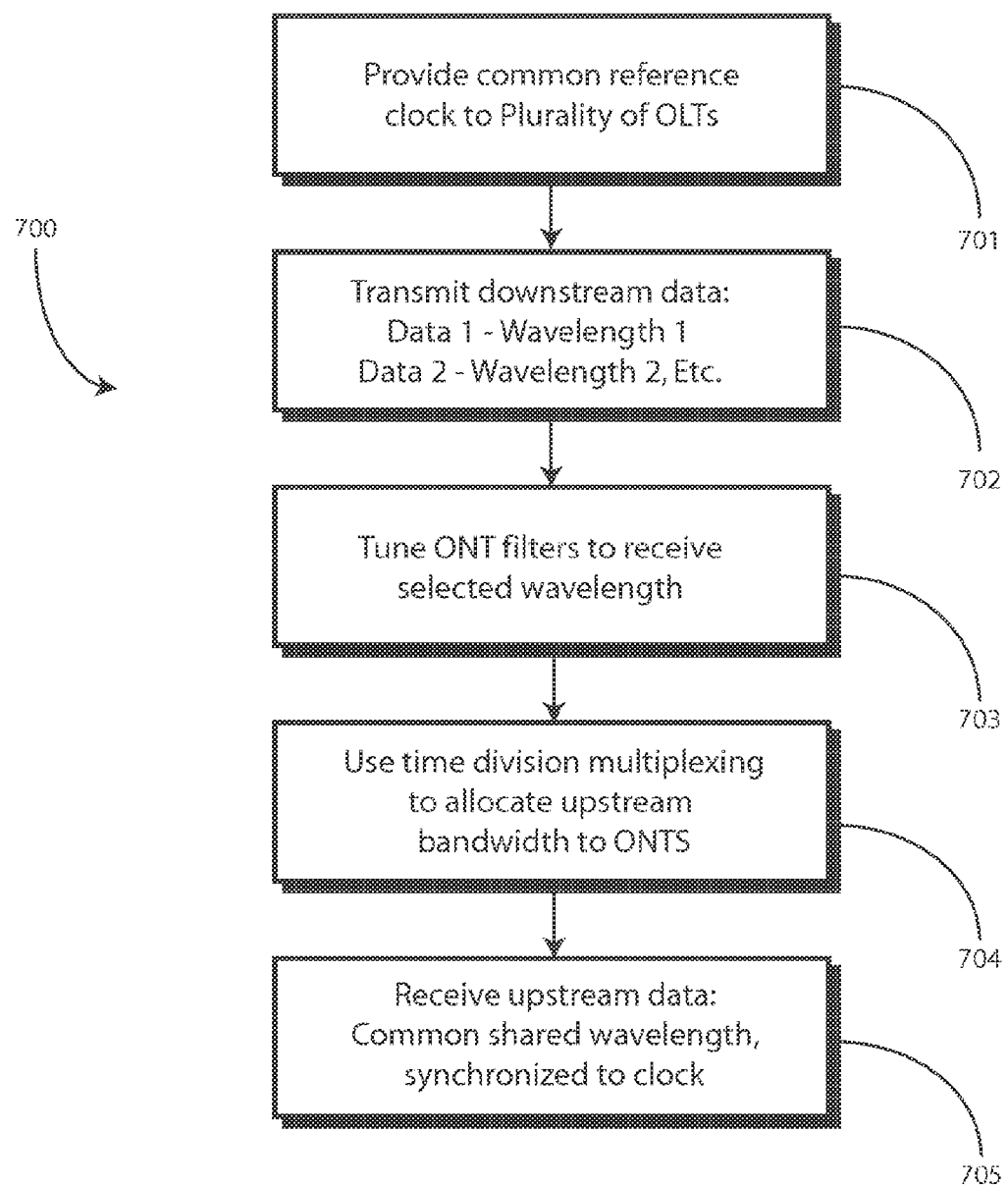
FIG. 7 illustrates a method of managing a passive optical network configured in accordance with one or more embodiments of the invention.

Turning now to FIG. 7, illustrated therein is another method 700 for passive optical networks configured in accordance with one or more embodiments of the invention. Many of the steps of the method 700 have been described above with reference to the systems shown in FIGS. 3-6. Accordingly, those steps will be briefly described here.

At step 701 at least a first optical line terminal operating at a first wavelength and a second optical line terminal operating a second wavelength that different from the first wavelength are synchronized. In one embodiment, the synchronizing comprises providing a common clock to both the first optical line terminal and the second optical line terminal.

At step 702, the first optical line terminal and the second optical line terminal transmit downstream data to the optical distribution network using the first wavelength for some data and the second wavelength for other data. In one embodiment, the transmitting comprises transmitting to a first optical network terminal using the first wavelength and transmitting to a second optical network terminal using the second wavelength. Said differently, the transmitting can include transmitting first downstream data from a first optical line terminal to a first optical network terminal using a first wavelength and transmitting second downstream data from a second optical line terminal to a second optical network terminal using a second wavelength that is different from the first wavelength.

At step 703, each of a plurality of optical network terminals is tuned to receive a predetermined wavelength that is different from every other wavelength received by each other optical network terminals. This step 703 can include tuning a tunable filter associated with a first optical network terminal to receive the first wavelength. Similarly, a second tunable filter associated with a second optical network terminal is tuned to receive the second wavelength. In one embodiment, the tuning results in band pass filtering the first wavelength at the first optical network terminal and band pass filtering the second wavelength at the second optical network terminal.

At step 704, upstream data is managed by allocation among the optical network terminals. The allocation can be time based. For instance, first upstream data from the first optical network terminal can be time division multiplexed with second upstream data from the second optical network terminal on a shared, common upstream wavelength. The upstream wavelength, being different from downstream wavelengths, thus is independent of the tuning performed in step 703. The allocation of step 704 can include instructing each optical network terminal to transmit in the upstream link using a time division multiple access protocol. At step 705, upstream data is received from the optical network terminals on the upstream wavelength shared by each optical network terminal.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A method of operation in a passive optical network, the method comprising:

transmitting wave division multiplexed data in a downstream link of an optical distribution network using a plurality of optical line terminals, each optical line terminal operating at a unique wavelength and being synchronized to each other optical line terminal by a common reference;

coordinating each optical line terminal of the plurality of optical line terminals as a function of the common reference and by transmission frame to provide each optical line terminal with a common zero across operating wavelengths; and receiving upstream data from an upstream link of the optical distribution network on a shared common upstream wavelength.

2. The method of claim 1, further comprising tuning each optical network terminal of a plurality of optical network terminals to receive a predetermined wavelength that is different from every other wavelength received by each other optical network terminal of the plurality of optical network terminals.

3. The method of claim 2, wherein the tuning comprises filtering multiple coexistent wavelengths in the downstream link to obtain the predetermined wavelength.

4. The method of claim 1, further comprising allocating a bandwidth of the upstream link to a plurality of optical network terminals coupled to the optical distribution network.

5. The method of claim 4, wherein the allocating comprises instructing the plurality of optical network terminals to transmit in the upstream link using a time division multiple access protocol.

6. The method of claim 1, wherein the transmitting comprises transmitting first downstream data from a first optical line terminal to a first optical network terminal using a first wavelength and transmitting second downstream data from a second optical line terminal to a second optical network terminal using a second wavelength different from the first wavelength.

7. The method of claim 6, further comprising band pass filtering the first wavelength at the first optical network terminal and band pass filtering the second wavelength at the second optical network terminal.

8. The method of claim 6, wherein the shared common upstream wavelength is different from the first wavelength and the second wavelength.

9. A passive optical network component, comprising:
a plurality of optical line transmission terminals configured for wavelength division multiplexed downstream data transmission on an optical distribution network to a plurality of optical network terminals, each optical line transmission terminal operating at a unique wavelength;
a synchronizer configured to synchronize signaling from each of the plurality of optical line transmission terminals with a common reference;
an upstream link manager configured to manage an upstream link of the optical distribution network using time division multiplexed access allocated between the plurality of optical network terminals, the upstream link manager coordinating each optical line transmission terminal as a function of the common reference and by transmission frame to provide each optical line transmission terminal with a common zero across operating wavelengths; and
an optical line receiver terminal configured to receive upstream data from the optical distribution network on a common wavelength shared by the each of the plurality of optical network terminals.

10. The passive optical network component of claim 9, wherein:
the plurality of optical line transmission terminals comprises:
at least a first optical line transmission terminal configured to transmit at a first wavelength according to the common reference; and
a second optical line transmission terminal configured to transmit at a second wavelength according to the common reference; and
the common wavelength shared by the each of the plurality of optical network terminals is different from both the first wavelength and the second wavelength.

11. The passive optical network component of claim 9, wherein the optical distribution network comprises an optical fiber shared by the plurality of optical line transmission terminals and the plurality of optical network terminals.

12. The passive optical network component of claim 9, further comprising the plurality of optical network terminals.

13. The passive optical network component of claim 12, further comprising a filter disposed between the optical distribution network and each optical network terminal, the filter being configured to select a single wavelength from a plurality of multiple coexistent wavelengths propagating in the optical distribution network.

14. A method comprising:
synchronizing by a common reference at least a first optical line terminal operating at a first wavelength and a second optical line terminal operating a second wavelength different from the first wavelength;
transmitting downstream data to an optical distribution network using the first wavelength for some data and the second wavelength for other data;
coordinating each optical line terminal of a plurality of optical line terminals as a function of the common reference and by transmission frame to provide each optical line terminal with a common zero across operating wavelengths;
polling each optical network terminal of the plurality of optical network terminals for a data backlog level;
allocating more transmission time to higher data backlogged optical network terminals than to lesser data backlogged optical network terminals; and
receiving upstream data from the plurality of optical network terminals on an upstream wavelength shared by the plurality of optical network terminals.

15. The method of claim 14, wherein the synchronizing comprises providing a common clock to both the first optical line terminal and the second optical line terminal.

16. The method of claim 14, further comprising tuning a first optical network terminal to receive the first wavelength and tuning a second optical network terminal to receive the second wavelength.

17. The method of claim 14, wherein the transmitting comprises transmitting to a first optical network terminal using the first wavelength and transmitting to a second optical network terminal using the second wavelength.

18. The method of claim 17, wherein first upstream data from the first optical network terminal is time division multiplexed with second upstream data from the second optical network terminal on the upstream wavelength.

19. The method of claim 14, wherein the upstream wavelength is independent of the tuning to receive the first wavelength and the tuning to receive the second wavelength.

* * * * *